United States Patent [19]

Takahashi

[11] Patent Number: 4,979,101
[45] Date of Patent: Dec. 18, 1990

[54] APPARATUS FOR RETRIEVING CHARACTER STRINGS

[75] Inventor: Kousuke Takahashi, Tokyo, Japan

[73] Assignee: NEC Corporation, Tokyo, Japan

[21] Appl. No.: 279,249

[22] Filed: Dec. 1, 1988

Related U.S. Application Data

[63] Continuation of Ser. No. 720,930, Apr. 8, 1985, abandoned.

[30] Foreign Application Priority Data

Apr. 6, 1984 [JP] Japan .............................. 59-68495
Dec. 19, 1984 [JP] Japan ............................. 59-267831

[51] Int. Cl.$^5$ .......................... G06F 7/06; G06F 7/20
[52] U.S. Cl. .................................. 364/200; 364/225;
364/225.6; 364/232.93; 364/244; 364/244.5;
364/253; 364/253.1; 364/259; 364/259.1;
364/259.5; 364/259.8
[58] Field of Search ... 364/200 MS File, 900 MS File

[56] References Cited

U.S. PATENT DOCUMENTS 4,516,173 5/1985 Abe et al. .............................. 358/261

Primary Examiner—Gareth D. Shaw
Assistant Examiner—Rebecca L. Rudolph
Attorney, Agent, or Firm—Sughrue, Mion, Zinn, Macpeak & Seas

[57] ABSTRACT

An apparatus for retrieving or searching character strings which can be fabricated with a simplified structure and operate at a high speed. A memory circuit storing a standard character string is employed. The memory circuit includes a plurality of input lines each corresponding to one of the characters in the standard character string, a plurality of output lines and memory cells. Each of output lines of the memory circuit is used to enable transfer operation of one stage of a sequential logic circuit, and a detection output is derived from the sequential logic circuit when all the stages are enabled in a predetermined order.

5 Claims, 5 Drawing Sheets

| JAPANESE | CLASS | ENGLISH |
|---|---|---|
| TANSAKU | 1 | SEARCH |
| RYOKOU | 2 | TRAVEL |
| CHOUSA | 3 | INVESTIGATION |
| BOUKEN | 4 | ADVENTURE |

FIG 7
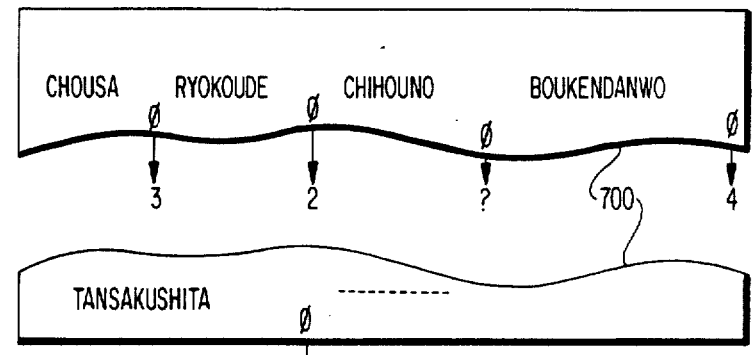
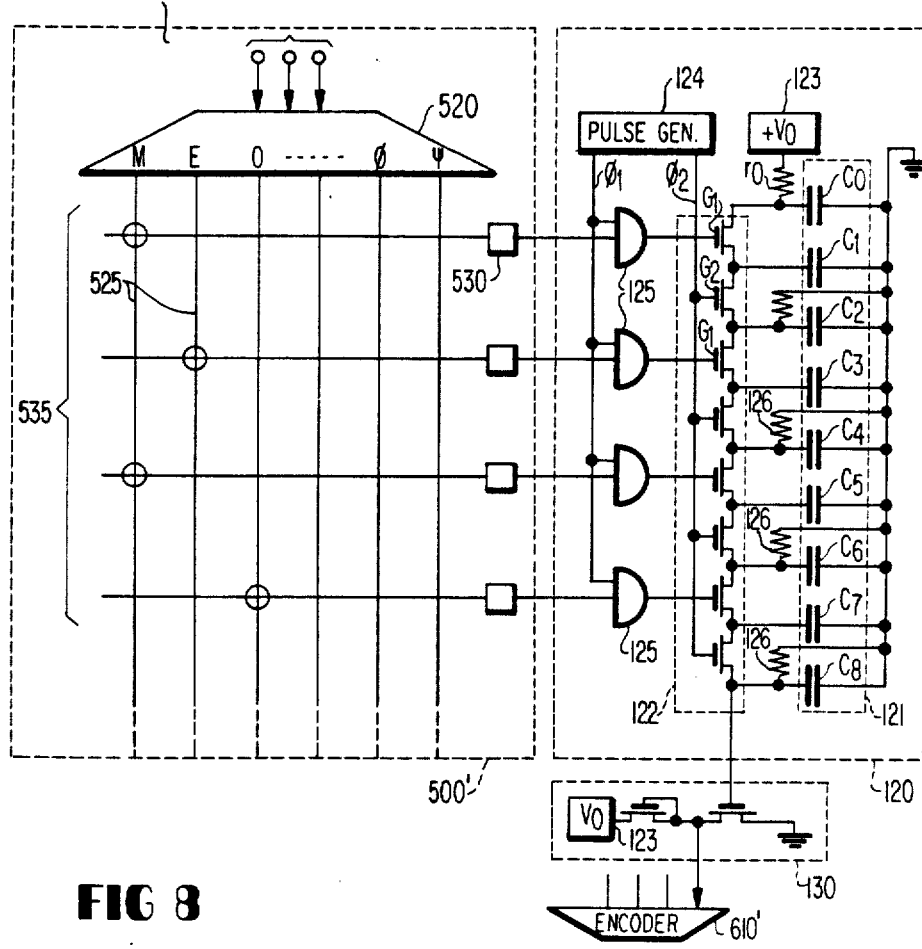
FIG 8

APPARATUS FOR RETRIEVING CHARACTER STRINGS

This is a continuation of application Ser. No. 06/720,930, filed Apr. 8, 1985, now abandoned.

BACKGROUND OF THE INVENTION

The present invention relates to an apparatus for retrieving character strings, and particularly to an apparatus for retrieving or finding out necessary and/or significant character strings or messages from a group of sentences, data and text.

Character string retrieval apparatuses have important roles in achieving word-processing and inter-translation of languages, searching key words included in records of a data base, and performing pattern recognition in video data processing.

Conventional data retrieval processing has been performed by software in computers, and in such cases, a character string input is sequentially compared to all the standard character strings registered. Accordingly, if there is an error in inputting character strings such as omission of some characters in the input character strings or input of unnecessary characters, then satisfactory search or retrieval cannot be expected. If the system is designed to avoid the effect of such errors in the input data, then the number of the registered standard character strings becomes too large, resulting in too lengthy a processing time.

As described above, the conventional technique for retrieving or searching character strings by computers has bee disadvantageous in that the processing time of character strings is too slow and in that flexibility in treating errors included in input character strings is poor.

SUMMARY OF THE INVENTION

It is an object of the present invention to provide an apparatus for retrieving character strings at a high speed.

It is another object of the present invention to provide such an apparatus fabricated in the form of integrated circuits.

The character string retrieving apparatus according to the present invention includes a memory circuit for storing characters. The memory circuit has a plurality of input lines and a plurality of output lines. Each of the input lines corresponds to one character, and When a memory cell coupled to one of the input lines stores a logic "1", the output line coupled to that memory cell is activated in response to the activation of the one input line to which it is connected. A sequential logic circuit is coupled to the output lines of the memory in such a manner that the output lines are coupled to the sequential logic circuit in the order of the characters of the character string to be detected, to thereby make the logic states of the respective stages of the sequential logic circuit true in sequence towards the output thereof. For example, the output line corresponding to a first character in the character string is coupled to a first stage of the sequential logic circuit and the output line corresponding to the i-th (i being an integer of at least 2) character of the character string is coupled to the i-th logic stage of the sequential logic circuit. Thus, when all of the characters to be detected are sequentially inputted, a "1" level output is generated from the sequential logic circuit. As the sequential logic circuit, a shift register or a charge transfer device can be effectively utilized.

According to the present invention, the memory and the sequential logic circuit can be formed on the same semiconductor substrate. Also, the retrieving operation can be achieved during the transition time of the sequential logic circuit.

BRIEF DESCRIPTION OF THE DRAWINGS

FIG. 7 is a diagram explaining operations of the embodiment of FIG. 6; and

FIG. 8 is a schematic block diagram showing a third embodiment of the present invention.

DETAILED DESCRIPTION OF THE INVENTION

Figures 1, 2:
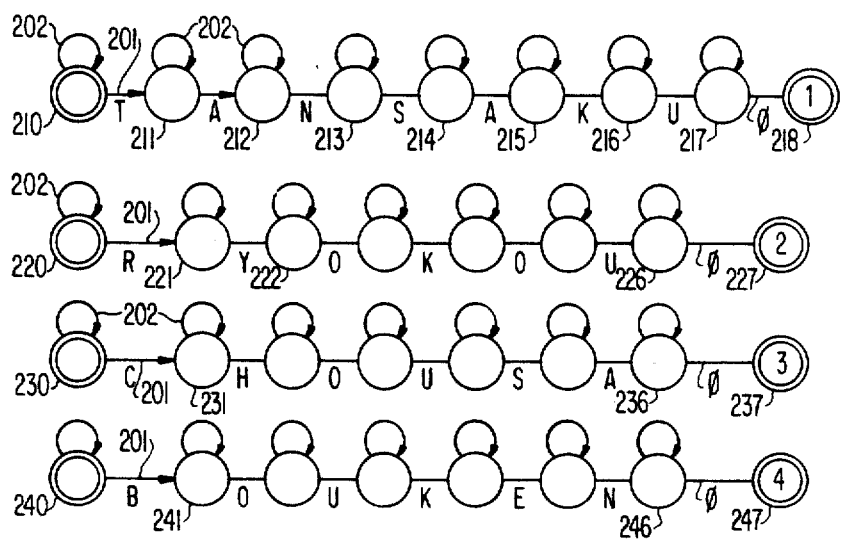
FIG. 1 is a diagram showing inter-translation relations between English and Japanese.
FIG. 2 a diagram showing state-transition diagrams in retrieving character strings.

FIG. 1 shows task examples of inter-translations of character strings between Japanese and English, in which Japanese words are listed in the left side column while corresponding English words are shown in the right side column. This inter-translation function is the same as that of a Japanese-English dictionary and is called a dictionary function. In order to perform the dictionary function, the following steps are necessitated:

(1) associating each Japanese word in a memory with a class number shown at the center column;

(2) associating each English word corresponding to a Japanese word with the same class number;

(3) comparing each input Japanese word with the registered English words to output the corresponding class number; and (4) outputting one of the registered English words in response to the output class number.

Among the above four steps, the third step (3) is the most difficult one because this step must be conducted by comparing an unknown input word with all of the standard words stored in the memory.

FIG. 2 shows state-transitions in sequential logic for retrieving input words. Here, the input words correspond to character strings. A word delimiting character is provided at the beginning or end of each word. As the components of the character strings, the letters A, B, C, E, H, K, N, O, R, S, T, V, Y are considered, and $\phi$ is employed as the word delimiting character. The state transition tables of FIG. 2 illustrate the processes of movement of the input characters by nodes indicated by circles and paths therebetween. Start nodes 210, 220, 230 and 240 denoted by two co-axial circles correspond to the step where the states are set prior to the input of a character string. Termination nodes 218, 227, 237 and 247 correspond to the step where the presence of the states of character strings is checked after the input of the character strings.

When characters T, A, N, S, A, K, U, $\phi$ are input sequentially, a pointer which shows the position of the states moves from the beginning node 210 to the termination node 218 through nodes 211, 212, 213, 214, 215, 216 and 217. There is no case where the pointer moves to another termination node such as 227, 237 or 247. As a result, the above character string "T A N S A K U" is judged as belonging to the class "1".

Similarly, when characters "R, Y, O, K, O, U $\phi$ are sequentially input, a pointer at the beginning node 220 moves only to the termination node 227. The other two character strings are detected in the same manner.

Here, assuming the i-th node from the beginning in the state-transition for the j-th class character string as (i, j), the path for allowing the state-transition from the node (i, j) to the node (vi+1, j) is shown by transition paths 201 and is stored in the memory for the standard character string. Return paths 202 attached to the respective nodes (i, j) describe that characters other than the characters defined by the respective state-transition paths result in a return to their previous node (i, j).

Accordingly, the pointer set at the beginning node 210 cannot reach the termination node when a character string other than the registered character string is received. Thus, the judgement of the class will not be performed for a non-registered character string.

The judgement of character strings by the state-transition tables in sequential logic have heretofore been conducted by judgement processing programs in computers having a CPU and memory. However, input character strings are sequentially checked by reading algorithms for the respective classes of character strings, and hence processing time cannot be shortened.

Figure 3:
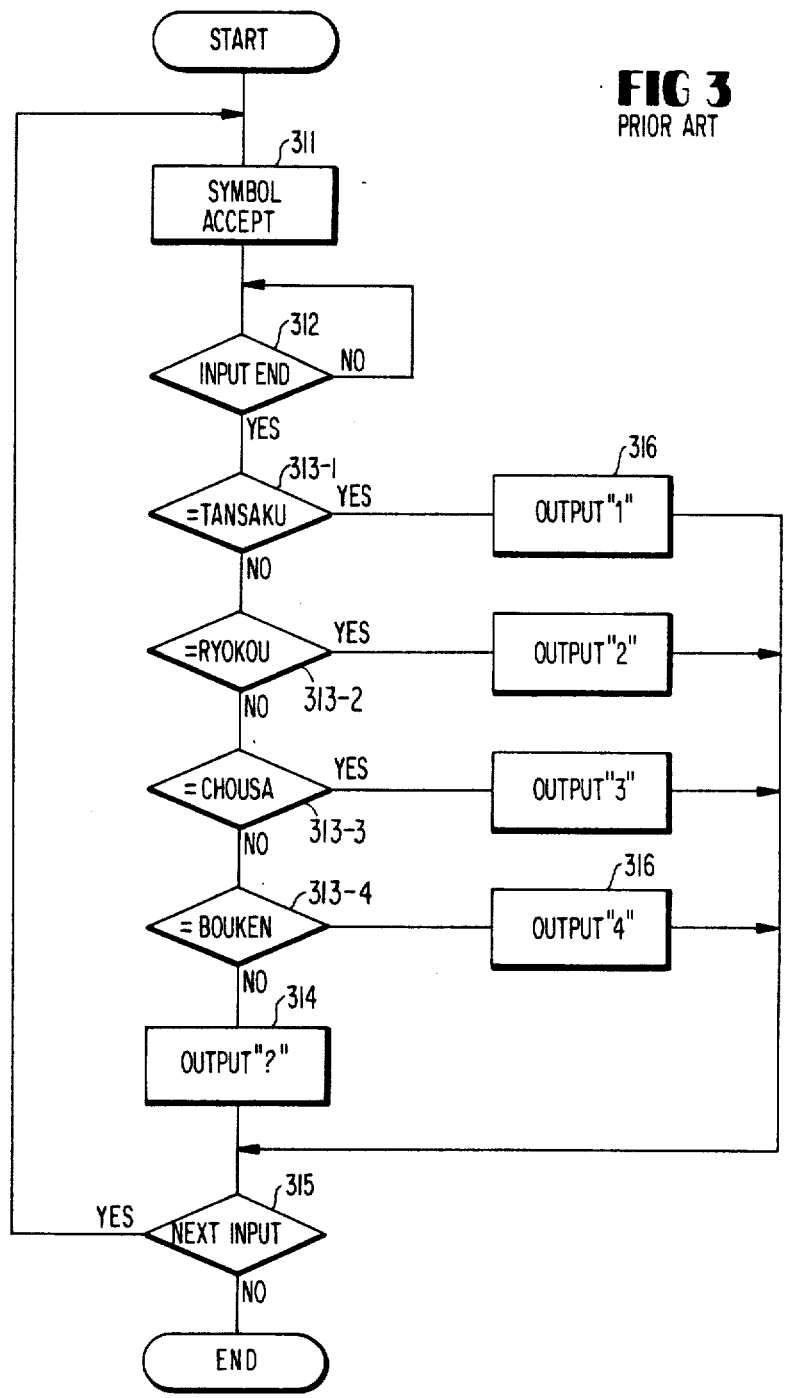
FIG. 3 is a diagram showing a flow chart of character string retrieval according to the prior art.

FIG. 3 shows a flow chart of character string retrieval according to the prior art. Alphabetic characters forming the character strings of FIG. 1 are sequentially accepted at a processing step 311 until the end of a word is detected, the input character string is transmitted to a class judging step 313-1. If it is accepted at the step 313-1, the processing moves to an output step 316. If it is not accepted at the step 313-1, the character string input is subjected to another class judging step 313-2. When the character string is not accepted by any one of the steps 313-1 to 313-4, then the processing moves to a step 314 and an output is provided indicating that the input character string is not classified into any one of the registered classes. After this, the processing moves to a step 315 which judges whether the next input character string is present or not. If. "Yes", the cycle returns to "START", otherwise the cycle ends.

An algorithm which compares an unknown character string input with the registered character strings on a word-by-word basis may be utilized for the class judging steps 313. In this case, a minor error such as the omission or addition of a character in the input character string makes the class judging of the input character string difficult.

Figure 4:
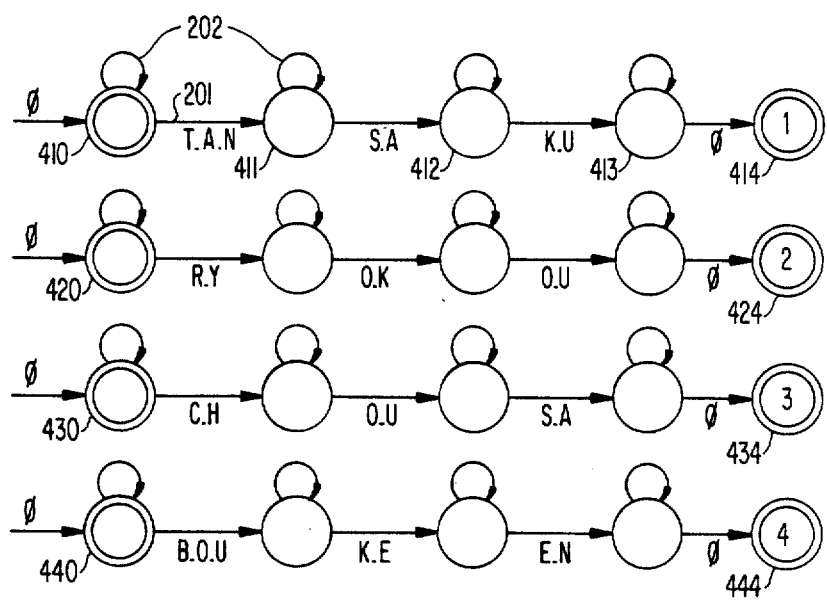
FIG. 4 is a diagram showing shortened state-transition tables.

From this point of view, the state-transition tables shown in FIG. 4 may be utilized to avoid the above shortening. Namely, in FIG. 4, pointers set at the beginning nodes 410, 420, 430, and 440 are adapted to recognize not only one character but also two or more characters and to then introduce the subsequent step. Also, the paths of state-transitions are shortened. Accordingly, in addition to the character string "T A N S A K U $\phi$", many similar character strings such as "T A S A K $\phi$", "A N S A K U $\phi$" caused by input error are accepted only through the nodes 410, 411, 412, 413 and 414. The same thing is true for the other nodes.

If the number of the nodes in the state-transition paths is further reduced, then erroneous judgement of character strings would occur. Therefore, the state-transition path must be determined in view of groups of standard character strings to be registered. However, it has been difficult to perform the above modified state-transitions according to the flow chart of FIG. 3, because the amount of CPU processing is increased. Thus, it has been disadvantageous in that the judging time of character strings is long and flexibility in avoiding input error is poor according to the conventional systems.

Figure 5:
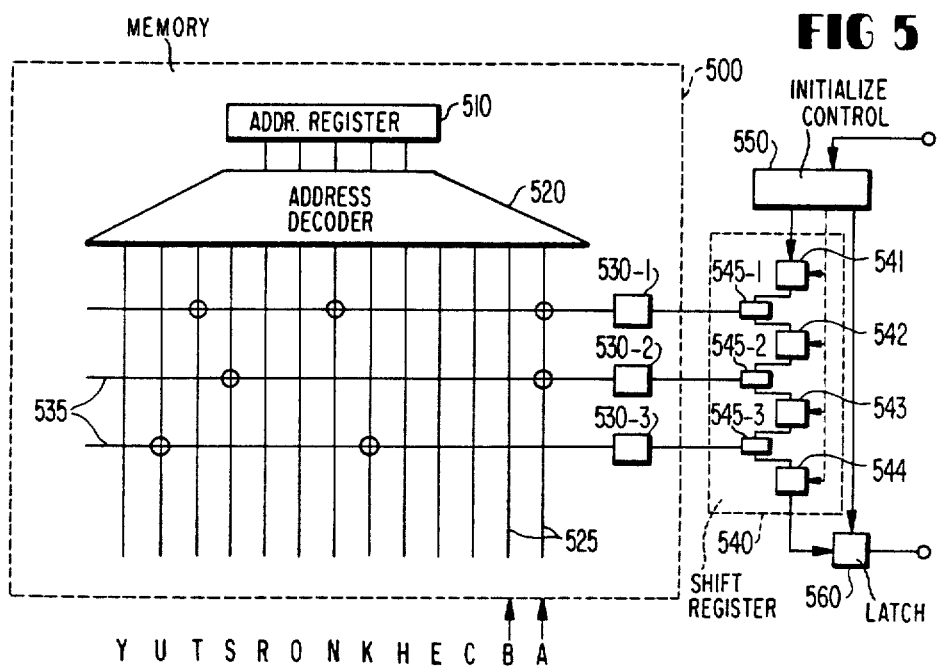
FIG. 5 is a schematic block diagram showing a first embodiment of the present invention.

With reference to FIG. 5, an apparatus for retrieving character strings according to a first embodiment of the present invention will now be described.

Characters are sequentially input to an address register 510 provided for a memory and are used by an address decoder 520 to select word lines 525 corresponding to the respective characters. A plurality of read/write (R/W) circuits 530-1 to 530-3 are provided for bit lines 535 intersecting with the word lines 525. Outputs of the R/W circuits are used to control switches 545-1 to 545-3 which are used to serially connect registers 541, 542, 543, and 544.

In the memory 500, among the intersections of the word lines 525 and bit lines 535, those with a circle store logic "1" while others without a circle store logic "0". Also, the word lines 525 correspond to A, B, C, E, H, K, N, O, R, S, T, U, Y from the right side towards the left side, respectively, as illustrated in FIG. 5.

A shift register 540 has the registers 541, 542. 543 and 544 in correspondence to the nodes 410, 411, 412, and 413 in the state-transition of FIG. 4, and the switches 545 are used as the transition paths 201. Each of the bit lines is adapted to produce a "1" level when one of the word lines intersecting with that bit line at the intersection with the circle mark is selected.

An initialize control circuit 550 detects the word delimiting character $\phi$ to set the content of the register 544 in a latch circuit 560 and then reset all of the registers 541, 542, 543 and 544. Thereafter, the circuit 550 sets a signal of "1" corresponding to the pointer in the register 541, which thus acts as a start node for the propagation of the "1" value through the registers. The switches 545 function to transmit the outputs of the registers to their subsequent registers. When at least one of the characters T, A and N is first inputted to the register 510, the R/W circuit 530-1 coupled to the first bit line 535 from the decoder 520 produces a "1" level output so that the "1" content of the register 541 is written to the second register 542 via the switch 545-1. In this instance, the second bit line coupled to the R/W circuit 530-2 generates a "0" level output, so that one content of the register 542 is not written to the subsequent register 543 in the case where the character T or N is inputted. When the characters A or S are inputted to the address register 510, the output of the R/W circuit 530-2 assumes a "1" level so that the content of the register 542 is written to the subsequent register 543 via the switch 545-2. Here, each of the registers 541 to 544 has the structure that, after it has assumed a "1" level, it continues to hold the "1" level until it is reset by the circuit 550. In this respect, the shift register 540 does not correspond to the state-transition table of FIG. 1 in one by one relation, but the important point is to transmit a "1" level to the last register 544 in response to the state of the bit lines, and the above feature of the register is not a problem. In the shift register 540, when the character string "T A S A K U" is inputted in sequence, the internal "1" level signal set in the first register 541 is written sequentially to the registers 542, 543 and 544. Therefore, when the word delimiting character $\phi$ is detected, the signal "1" is set in the latch circuit 560 under control of the circuit 550. The content of the latch circuit 560 assumes a "0" level when the last register 544 assumes a "0" level after next character string is inputted. Until the completion of the input of the next character string, the latch circuit 560 holds the judging result of the previous character string. The output of the latch circuit 560 shows whether the input character string is accepted or not.

The circuit of FIG. 5 is required to perform the state-transitions shown in FIG. 4. Therefore, the capacity of the memory 500 will be the product of the number of characters N, the number of nodes M and the number of classes K, i.e., "N×M×K". The number of nodes M may be smaller than the length of a character string. The processing time is determined by the product of the respective read-out time for the respective characters (about 200 nsec) and the length of the character string, but is not affected by the number of classes K.

Figure 6:
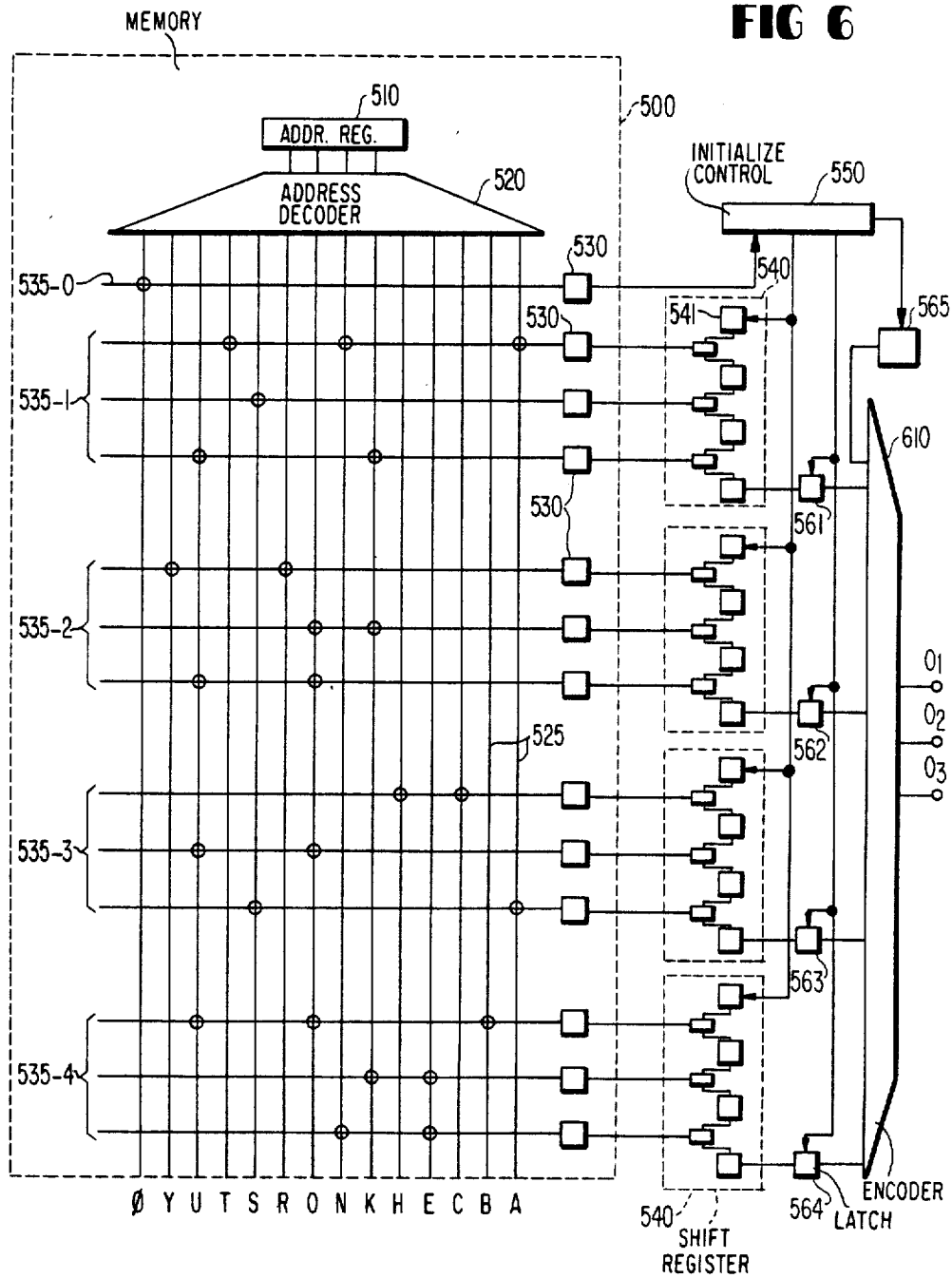
FIG. 6 is a schematic block diagram showing a second embodiment of the invention.

Referring to FIG. 6, a second embodiment of the present invention will now be described.

This embodiment is designed to retrieve the four classes of character strings shown in FIG. 4 simultaneously. In the memory 500, four groups of bit lines 535-1 to 535-4 are provided intersecting with the word lines 525. Each of the bit line groups is associated with the character string to be searched. Also, four sets of shift registers 540 and four latch circuits 561 to 564 are provided corresponding to four groups of bit lines 535-1 to 535-4, respectively. The outputs of the latch circuits 561 to 564 are provided to an encoder circuit 610 so that, after the input of character string, the retrieval output from one of the latch circuits 561 to 564 is decoded by the encoder 610 in the form of three-bit digital outputs $O_1$ to $O_3$.

Also in the memory 500, the word line corresponding to the word delimiting signal $\phi$ is provided and the bit line 535-0 is provided to detect $\phi$. The bit line 535-0 is connected to the R/W circuit 530 to control the control circuit 550, so that the setting of the latch circuits 561 to 564, the resetting of the registers other than the first registers 541, and the setting of the first registers 541 are performed.

A dummy latch circuit 565 is provided in order to set the outputs $O_1$ to $O_3$ at "0" when the character input string is not classified into any one of the classes. Namely, the dummy latch circuit 565 assumes a "1" level when the input character string is not classified and a "0" level when the input character string is classified and any one of the latches 561 to 564 assumes a "1" level. Thus, the encoder 610 produces an output indicating that the input character string is not classified. As the encoder 610, a priority encoder (e.g., SN 7414S produced by Texas Instruments, Inc.) can be utilized.

FIG. 7 shows examples of operations of the circuit in FIG. 6. A Japanese sentence "C H 0 U S A R Y 0 K U D E — ---" is composed of a plurality of words. i.e., character strings as shown in FIG. 7, in which the characters $\phi$ are imaginarily indicated. To the address decoder 510 in FIG. 6. characters C H O U S A $\phi$ R Y O K O U D E $\phi$ C H I H O U N O $\phi$ --- are sequentially inputted. and from the encoder 610 the retrieval outputs "3", "2", "?", "4" and "1" are generated as illustrated in FIG. 7. If a RAM (random access memory) is connected to the output of the encoder 610, the English words listed in the right column of FIG. are produced in response to the detected retrieval outputs. Thus, the translation from Japanese to English can be achieved.

FIG. 8 shows a third embodiment of the present invention. This embodiment is achieved by employing a charge transfer device 120 as one detailed example of the shift register 540 of FIG. 5. The memory section 500' has the same structure as the memory 500 of FIG. 5. The charge transfer device 120 is composed of an array 121 of capacitors $C_0$ to $C_8$, and a plurality sets of transfer gates 122 with each set including transfer gates $G_1$ and $G_2$ controlled by clock pluses $\phi_1$ and $\phi_2$ from a pulse generator 124. When the output of the R/W circuit 530 is active, the charge of $C_0$ is transferred to the subsequent $C_1$ in response to $\phi_1$. Then, the charge of $C_1$ is transferred to $C_2$ in response to $\phi_2$. The charge stored in $C_2$ is transferred to $C_3$ in response to the output of the corresponding AND gate. However, if the output of the corresponding AND gate does not become active within a predetermined time corresponding to a time constant of a resistor 126 and a capacitance of $C_2$, the charge stored in $C_2$ is discharged. Therefore, if an inconsistent character is included in the input character string, then the potential detected by an output circuit 130 becomes smaller. This function allows an indication of the degree of consistency between the input character string and the standard registered character string.

What is claimed is:

1. An apparatus for receiving a string of input characters and recognizing an approximate match between said string of input characters and a known character string, said apparatus comprising:

first means for receiving a delimiting signal, second means for receiving a sequence of input signals one by one after said delimiting signal is received, with said sequence of input signals collectively representing said input character string, a memory circuit having a plurality of input lines each corresponding to one character of a predetermined set of characters which set includes characters contained in said known character string, first to N-th output lines, a plurality of memory cells each coupled to one of said input lines and to one of said output lines with each output line being coupled to a respective group of said memory cells, each of said memory cells being programmed to one of first and second logic states, a memory cell programmed to said first logic state making the output line connected thereto active when the input line connected thereto is selected, a memory cell programmed to said second logic state causing no change to the output line connected thereto when the input line connected thereto is selected, at least two memory cells in each said group memory cells being programmed to said first logic state, and a selection circuit coupled to said second means and responsive to individual ones of said sequence of input signals received by said second means for selecting one of said input lines corresponding to each said individual one of said sequence of input signals, and a sequential logic circuit including first to N-th storage circuits each having an input terminal and an output terminal and each storing a single bit of binary data, first to N-th switch circuits, the i-ith ($2 \leq i \leq N$) switch circuit being connected between the output terminal of the (i−1)-th storage circuit and the input terminal of the i-th storage circuit, a first switch circuit of said first to N-th switch circuits being connected between a start node and the input terminal of a first storage circuit of said first to N-th storage circuits, means for applying a first signal level to said start node in response to the receipt of said delimiting signal, and first to N-th control means, the i-th ($1 \leq i \leq N$) control means being coupled to the i-th output line and the i-th switch circuit for making the i-th switch circuit conductive when the i-th output line is made active, the first signal level applied to said start node being transferred to the N-th storage circuit when said first the N-th output lines are made active one by one in the order of said output lines and the first signal level stored in the N-th storage circuit indicating an approximate match between said input character string and said known character string.

2. The apparatus according to claim 1, wherein each output line has an active signal level thereon when active, and wherein each of said control means includes a read circuit for reading the signal level on the output line connected thereto.

3. The apparatus according to claim 1, wherein said selection circuit includes a register for storing said received sequence of input signals and a decoder for selecting one of said input lines in accordance with the content of said register.

4. The apparatus according to claim 1, further comprising means for resetting said first to N-th storage circuits before said sequence of input signals are provided to said selection circuit.

5. An apparatus for receiving input character strings and recognizing approximate matches between each input character string and one of a plurality of known character strings, said apparatus comprising:

first means for receiving a delimiting signal, second means for receiving a plurality of sequence of successive input signals after said delimiting signal is received, with each input signal representing a character and each sequence of input signals representing one of said input character strings, a memory circuit including a plurality of input lines each corresponding to one character of a predetermined set of characters which set includes characters contained in each of said plurality of known character strings, a plurality of output lines and a plurality of memory cells each coupled to one of said input lines and one of said output lines, each of said memory cells being programmed to one of first and second logic states, some of said output lines being connected to at least two memory cells programmed to said first logic state, at least one other of said output lines being connected to one memory cell programmed to said first logic state, a memory cell programmed to said first logic state making the output lines connected thereto active when the input line connected thereto is selected, any output line connected to a given memory cell programmed to said second logic state remaining inactive even when the input line connected to said given memory cell is selected, said output liens being classified into a plurality of output line groups each corresponding to one of said known character strings, each of said output line groups including first to N-th output lines (N being a positive integer of 2 or more), and a selection circuit coupled to said second means and responsive to individual ones of said successive input signals received by said second means for selecting at least one of said input lines, a plurality of sequential logic circuits each provided for a respective one of said output line groups, each of said sequential logic circuits including first to N-th storage circuits each having an input terminal and an output terminal and storing a single bit of binary data, first to N-th switch circuits, the i-th ($2 \leq i \leq N$) switch circuit being connected between the output terminal of the (i−1)-th storage circuit and the input terminal of the i-th storage circuit, a first switch circuit of said first to N-th switch circuits being connected between a start node and the input terminal of a first storage circuit of said first to N-th storage circuits, means for applying a first signal level to said start node in response to the receipt of said delimiting signal, first to N-th control means the i-th ($1 \leq i \leq N$) control means being coupled to the i-th output line of the associated output line group of said memory circuit and tot he i-th switch circuit for making the i-th switch circuit conductive when said i-th output line of said associated output line group is made active, whereby the first signal level is transmitted to the N-th storage circuit through the first N-th switch circuits when said first to N-th output lines are made active in order, and an encoder circuit coupled to the output terminals of the N-th storage circuits of said plurality of sequential logic circuits for indicating an approximate match between each of the input character strings and one of said known character strings.

* * * * *

UNITED STATES PATENT AND TRADEMARK OFFICE
CERTIFICATE OF CORRECTION

PATENT NO. : 4,979,101

DATED : December 18, 1990

INVENTOR(S) : Takahashi

It is certified that error appears in the above-identified patent and that said Letters Patent is hereby corrected as shown below:

Col. 1, line 33, delete "bee" and insert --been--.

Col. 3, line 14, delete "vi" and insert --i--.

Col. 6, line 12, delete "pluses" and insert --pulses--.

Col. 6, line 65, delete "i-ith" and insert --i-th--.

Col. 8, line 10, delete "liens" and insert --lines--.

Col. 8, line 39, delete "tot he" and insert --to the--.

Signed and Sealed this

Fifteenth Day of September, 1992

Attest:

DOUGLAS B. COMER

*Attesting Officer*   *Acting Commissioner of Patents and Trademarks*